(12) United States Patent
Geng et al.

(10) Patent No.: US 9,225,569 B2
(45) Date of Patent: Dec. 29, 2015

(54) RESOURCE ALLOCATION METHOD AND BASE STATION IN ORTHOGONAL FREQUENCY DIVISION MULTIPLEXING SYSTEM

(71) Applicant: Huawei Technologies Co., Ltd., Shenzhen, Guangdong (CN)

(72) Inventors: Tingting Geng, Shanghai (CN); Yan Chen, Shanghai (CN); Kinnang Lau, Hong Kong (CN); Chungha Koh, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 206 days.

(21) Appl. No.: 14/167,078

(22) Filed: Jan. 29, 2014

(65) Prior Publication Data

US 2014/0146903 A1    May 29, 2014

Related U.S. Application Data

(63) Continuation of application No. PCT/CN2011/077810, filed on Jul. 29, 2011.

(51) Int. Cl.
*H04L 27/26* (2006.01)
*H04W 72/04* (2009.01)
*H04W 52/14* (2009.01)
(Continued)

(52) U.S. Cl.
CPC .......... *H04L 27/2601* (2013.01); *H04L 1/0002* (2013.01); *H04L 1/0015* (2013.01);
(Continued)

(58) Field of Classification Search
CPC ....... H04L 1/0009; H04L 1/203; Y02B 60/50
See application file for complete search history.

(56) References Cited

U.S. PATENT DOCUMENTS

| 6,088,335 | A  | 7/2000 | I et al. |
| 7,330,433 | B2 | 2/2008 | Shao et al. |

(Continued)

FOREIGN PATENT DOCUMENTS

| CN | 1870456 A | 11/2006 |
| CN | 1885748 A | 12/2006 |

(Continued)

OTHER PUBLICATIONS

Liexin Peng, et al., "Adaptive Resource Allocation and Scheduling for the Delay Limited OFDM Systems", 32nd IEEE Conference on Local Computer Networks, Oct. 1, 2007, p. 731-736.

(Continued)

*Primary Examiner* — Chandrahas Patel (57) ABSTRACT

A resource allocation method and a base station which includes: acquiring, by the base station, channel state information (CSI) of a current scheduling timeslot; obtaining a compensation factor according to the CSI and a preset packet error ratio, where the compensation factor is a value corresponding to the preset packet error ratio in an inverse cumulative distribution function of a non-central chi-square random variable and a non-central parameter; replacing the CSI with the compensation factor, and determining a functional relationship between rate and power of sending data by the base station if a packet error ratio of the base station is less than or equal to the preset packet error ratio; and determining, according to the functional relationship and a generalized dynamic back pressure algorithm, the rate and total power of sending data by the base station, so as to minimize the total power of the base station.

10 Claims, 3 Drawing Sheets

(51) Int. Cl.
*H04W 52/20* (2009.01)
*H04W 52/02* (2009.01)
*H04L 1/00* (2006.01)
*H04L 5/00* (2006.01)
*H04W 52/34* (2009.01)
*H04W 28/18* (2009.01)
*H04W 28/22* (2009.01)
*H04W 72/08* (2009.01)

(52) U.S. Cl.
CPC ............ *H04L1/0026* (2013.01); *H04L 1/0033* (2013.01); *H04L 5/003* (2013.01); *H04W 52/0206* (2013.01); *H04W 52/143* (2013.01); *H04W 52/20* (2013.01); *H04W 52/346* (2013.01); *H04W 72/0453* (2013.01); *H04W 28/18* (2013.01); *H04W 28/22* (2013.01); *H04W 72/08* (2013.01); *Y02B 60/50* (2013.01)

(56) References Cited

U.S. PATENT DOCUMENTS

| | | | |
|---|---|---|---|
| 7,409,015 | B1 | 8/2008 | Misra et al. |
| 7,804,805 | B2 | 9/2010 | Park et al. |
| 8,130,855 | B2 * | 3/2012 | Kwak ............... H04B 7/0408 375/267 |
| 2007/0110003 | A1 | 5/2007 | Tujkovic et al. |
| 2008/0070564 | A1 | 3/2008 | Li et al. |
| 2008/0090564 | A1 | 4/2008 | Najafi et al. |
| 2008/0219364 | A1 | 9/2008 | Hui et al. |

FOREIGN PATENT DOCUMENTS

| | | |
|---|---|---|
| CN | 101697637 A | 4/2010 |
| WO | WO 2007/024324 A2 | 3/2007 |
| WO | WO 2007/058508 A1 | 5/2007 |
| WO | WO 2009/019608 A2 | 2/2009 |

OTHER PUBLICATIONS

Vincent Kin Nang Lau, et al., "Asymptotic Tradeoff between Cross-Layer Goodput Gain and Outage Diversity in OFDMA Systems with Slow Fading and Delayed CSIT", IEEE, Jun. 24-29, 2007, p. 2756-2760.

Francesc Rey, et al., "Robust Power Allocation Algorithms for MIMO OFDM Systems With Imperfect CSI", IEEE Transactions on Signal Processing, vol. 53, No. 3, Mar. 2005, p. 1070-1085.

Vincent Kin Nang Lau, et al., "Asymptotic Tradeoff between Cross-Layer Goodput Gain and Outage Diversity in OFDMA Systems with Slow Fading and Delayed CSIT", IEEE Transactions on Wireless Communications, vol. 7, No. 7, Jul. 2008, p. 2732-2739.

Yingwei Yao, et al., "Rate-Maximizing Power Allocation in OFDM Based on Partial Channel Knowledge", IEEE Transactions on Wireless Communications, 2004, p. 1-10.

Ying Cui, et al., "Distributive Stochastic Learning for Delay-Optimal OFDMA Power and Subband Allocation", IEEE Transactions on Signal Processing, vol. 58, No. 9, Sep. 2010, p. 4848-4858.

Vincent K. N. Lau, et al., "Delay-Optimal Power and Precoder Adaptation for Multi-Stream MIMO Systems", IEEE Transactions on Wireless Communications, vol. 8, No. 6, Jun. 2009, p. 3104-3111.

Xi-Ren Cao, "Stochastic Learning and Optimization—A Sensitivity-Based Approach", Proceedings of the 17th World Congress The International Federation of Automatic Control, Jul. 6-11, 2008, p. 3480-3492.

Huai-Rong Shao, et al., "Dynamic Resource Control for High-Speed Downlink Packet Access Wireless Channel", Mitsubishi Electric Research Laboratories, May 2003, 8 pages.

Michael J. Neely, "Energy Optimal Control for Time-Varying Wireless Networks", IEEE Transactions on Information Theory, vol. 52, No. 7, Jul. 2006, p. 2915-2934.

Shuguang Cui, et al., "Energy-constrained Modulation Optimization for Coded Systems", Globecom 2003, p. 372-376.

Randall A. Berry, et al., "Communication Over Fading Channels With Delay Constraints", IEEE Transactions on Information Theory, vol. 48, No. 5, May 2002, p. 1135-1149.

Leandros Tassiulas, et al., "Stability Properties of Constrained Queueing Systems and Scheduling Policies for Maximum Throughput in Multihop Radio Networks", Proceedings of the 29th Conference on Decision and Control, Dec. 1990, p. 2130-2132.

Leonidas Georgiadis, et al., "Resource Allocation and Cross-Layer Control in Wireless Networks", Foundations and Trends in Networking, vol. 1, No. 1, 2006, 144 pages.

* cited by examiner

RESOURCE ALLOCATION METHOD AND BASE STATION IN ORTHOGONAL FREQUENCY DIVISION MULTIPLEXING SYSTEM

CROSS-REFERENCE TO RELATED APPLICATIONS

This application is a continuation of International Application No. PCT/CN2011/077810 filed on Jul. 29, 2011, which is hereby incorporated by reference in its entirety.

TECHNICAL FIELD

The present invention relates to the field of mobile communications, and in particular, to a resource allocation method and a base station in an orthogonal frequency division multiplexing (OFDM, Orthogonal Frequency Division Multiplexing) system.

BACKGROUND

With the increasing development and change of the communications technologies, a radio technology gradually develops into a broadband radio network, and services are also developed from voice services to multimedia services. In addition, demands for multimedia services such as a video, a video conference, and a game are continuously growing. Generally, these services are called streaming services and are quite sensitive to quality of service (QoS, Quality of Service) of delay, which is reflected in queue time delay limitation in an allocation principle of radio resource management (RRM, Radio Resource Management). Based on different requirements for time delay, regarding energy saving, there is room for optimization of varying degrees in a design of a system transmission resource allocation algorithm.

For the design of the system transmission resource allocation algorithm, channel state information (CSI, Channel State Information) is very important. In an actual system, the CSI is always not ideal enough, and the CSI may be not accurate enough because of an accuracy limitation caused by a difference between measurement time and use time. Therefore, channel state information at transmitter (CSIT, Channel State Information at Transmitter) determined by a base station based on the CSI is also inaccurate. However, in many existing designs of the system transmission resource allocation algorithm, it is assumed that an RRM algorithm of a system is ideal, and a packet error problem caused by CSIT inaccuracy is ignored. However, inaccuracy of CSIT information will affect an actual instant channel capacity of the system, and when the system capacity cannot be determined, a packet error probability cannot approach zero even when channel code with a strong error-correcting feature is used.

In a study, the inventor found that a resource allocation method in the prior art has the following defects: The problem of non-ideal CSI is not considered in the prior art, and as a result, a relatively large packet error ratio is easily produced when a base station transmits data, which degrades system performance. In addition, in an existing resource allocation method for services sensitive to time delay, total power consumption of sending data by the base station is relatively high. Further, there is no such a method for lowering the total power consumption of the system on the basis of considering a trade-off relationship between power and time delay of the base station.

SUMMARY

Embodiments of the present invention provide a resource allocation method and a base station in an OFDM system used for a base station to dynamically adjust rate and power of sending data in each scheduling timeslot, which can effectively reduce an impact of inaccurate CSI on a system packet error ratio and lower total power consumption of sending data by the base station.

The resource allocation method in the embodiment of the present invention includes: acquiring, by a base station, channel state information CSI of a current scheduling timeslot; obtaining a compensation factor according to the CSI and a preset packet error ratio, where the compensation factor is a value corresponding to the preset packet error ratio in an inverse cumulative distribution function of a non-central chi-square random variable and a non-central parameter; replacing the CSI with the compensation factor, and determining a functional relationship between rate and power of sending data by the base station if a packet error ratio of the base station is less than or equal to the preset packet error ratio; and determining, according to the functional relationship and a generalized dynamic back pressure algorithm, the rate and total power of sending data by the base station, so as to minimize the total power of the base station.

The base station in the embodiment of the present invention includes: a first acquiring unit, configured to acquire, by a base station, channel state information CSI of a current scheduling timeslot; a compensation factor determining unit, configured to obtain a compensation factor according to the CSI, where the compensation factor is a value of a preset packet error ratio in an inverse cumulative distribution function of a non-central chi-square random variable and a non-central parameter; a functional relationship determining unit, configured to replace the CSI with the compensation factor, and determine a functional relationship between rate and power of sending data by the base station if a packet error ratio of the base station is less than or equal to the preset packet error ratio; and a resource allocation unit, configured to determine, according to the functional relationship and a generalized dynamic back pressure algorithm, the rate and total power of sending data by the base station, so as to minimize the total power of the base station, where the generalized dynamic back pressure algorithm is a back pressure algorithm including a delay factor and a power-delay trade-off parameter.

It can be seen from the foregoing technical solution that the present invention has the following advantages:

a compensation factor is determined by using CSI and a preset packet error ratio, the CSI is replaced with the compensation factor, and a functional relationship between rate and power for a base station to send data is determined when a packet error ratio of the base station is less than or equal to the preset packet error ratio. The packet error problem caused by inaccuracy of non-ideal CSI is effectively solved by using the compensation factor, and the packet error ratio of the base station can be effectively controlled. In addition, the rate and total power of sending data by the base station are determined by using the functional relationship and a back pressure algorithm that includes a delay factor and a power-delay trade-off parameter, so that the total power of the base station is minimized, and power consumption of the base station is lowered.

DETAILED DESCRIPTION

Embodiments of the present invention provide a resource allocation method and a base station in an OFDM system, used for a base station to determine rate and total power consumption of sending data in each scheduling timeslot, which can dynamically allocate and adjust resources for different timeslots, effectively reduce a packet error problem caused by inaccuracy of non-ideal CSI, and achieve minimum total power consumption.

Figure 1:
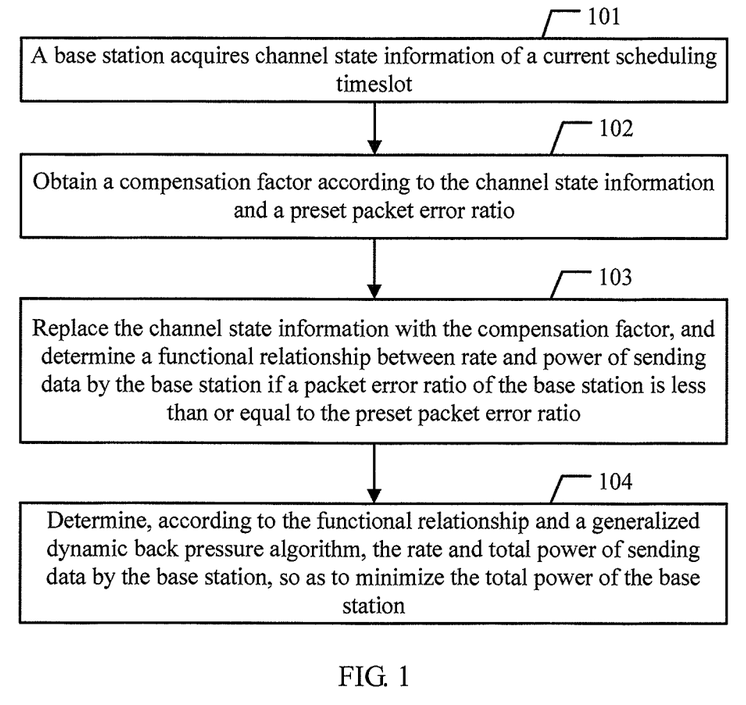
FIG. 1 is a schematic diagram of a resource allocation method in an OFDM system according to an embodiment of the present invention.

Refer to FIG. 1, FIG. 1 is an embodiment of a resource allocation method in an OFDM system according to an embodiment of the present invention, which includes the following steps.

101: A base station acquires channel state information of a current scheduling timeslot.

In the OFDM system, the base station performs resource allocation in units of scheduling timeslots, and allocates rate and total power of sending data by the base station in each scheduling timeslot.

In the embodiment of the present invention, the base station acquires CSI of a subcarrier in the current scheduling timeslot, where the CSI includes channel quality indication information, precoding matrix indicator information, and rank indicator information.

102: Obtain a compensation factor according to the channel state information and a preset packet error ratio.

In the embodiment of the present invention, the base station obtains the compensation factor according to the CSI and the preset packet error ratio, where the compensation factor is a value corresponding to the preset packet error ratio in a cumulative distribution function of a non-central chi-square random variable and a non-central parameter.

103: Replace the channel state information with the compensation factor, and determine a functional relationship between rate and power of sending data by the base station if a packet error ratio of the base station is less than or equal to the preset packet error ratio.

After obtaining the compensation factor, the base station replaces the CSI with the compensation factor, and determines the functional relationship between the rate and the power of sending data by the base station if the packet error ratio of the base station is less than or equal to the preset packet error ratio.

In the embodiment of the present invention, the functional relationship between the rate and the power of sending data by the base station is determined on the premise that the actual packet error ratio of the base station is less than or equal to the preset packet error ratio, which can effectively solve the packet error problem caused by non-ideal CSI.

104: Determine, according to the functional relationship and a generalized dynamic back pressure algorithm, the rate and the total power of sending data by the base station, so as to minimize the total power of the base station.

In the embodiment of the present invention, the base station determines, according to the functional relationship and the generalized dynamic back pressure algorithm (GDBP, Generalized Dynamic Back Pressure), the rate and the total power of sending data by the base station, so as to minimize the total power of the base station, where the GDBP is a back pressure algorithm (DBP, Dynamic Back Pressure) including a delay factor and a power-delay trade-off parameter. The delay factor is used to indicate urgency of time delay during data transmission, and the power-delay trade-off parameter is used to indicate a trade-off relationship between the power of sending data by the base station and delay performance. Using the GDBP including the delay factor and the power-delay trade-off parameter may enable the base station to determine the most optimized rate and total power of sending data on the premise of considering requirements on the delay performance and power consumption.

In the embodiment of the present invention, the total power of sending data is a sum of the power of sending data by the base station and circuit power.

In the embodiment of the present invention, a compensation factor is determined by using CSI, the CSI is replaced with the compensation factor, and a functional relationship between rate and power of sending data by a base station is determined when a packet error ratio of the base station is less than or equal to a preset packet error ratio, so that the base station can allocate a resource in the case of considering non-ideal CSI, and effectively control the packet error ratio of the base station. In addition, optimal rate and total power of sending data by the base station are determined by using the functional relationship and GDBP that includes a delay factor and a power-delay parameter trade-off parameter, so that total power consumption of sending data by the base station may be minimized, thereby lowering energy consumption.

Figure 2:
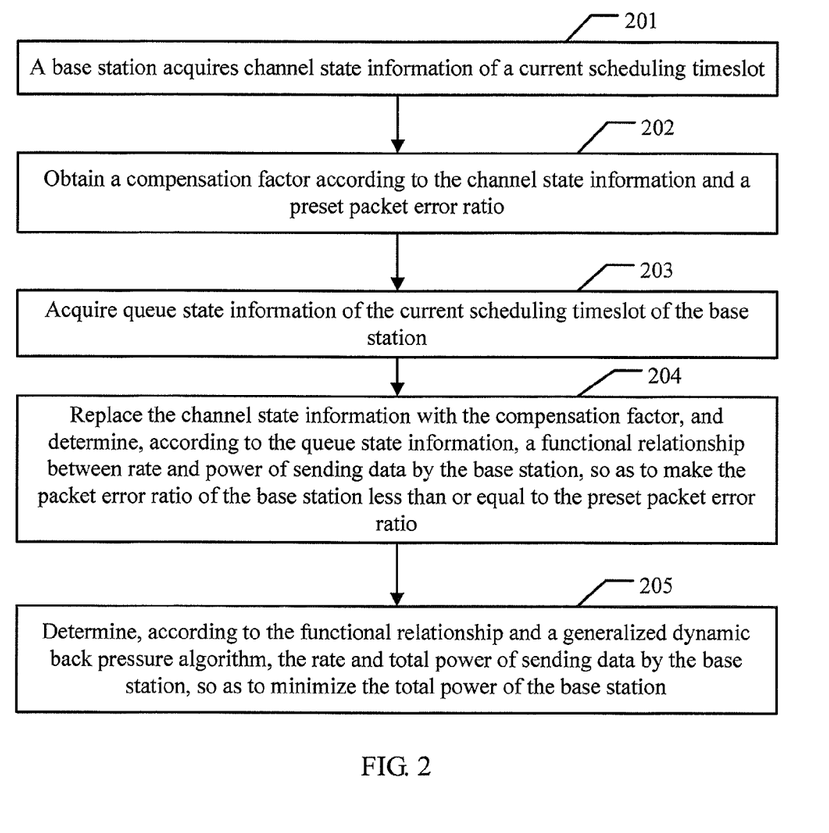
FIG. 2 is another schematic diagram of a resource allocation method in an OFDM system according to an embodiment of the present invention.

Refer to FIG. 2 for a better understanding of the technical solution of the present invention. FIG. 2 is an embodiment of a resource allocation method in an OFDM system according to an embodiment of the present invention, which includes the following steps.

201: A base station acquires channel state information of a current scheduling timeslot.

In the embodiment of the present invention, the base station acquires CSI of a subcarrier in the current scheduling timeslot. The CSI reflects changes of a wireless transmission channel quality over time, is a result of a combined action of different types of channel fading (such as path loss, shadow fading, and fast fading), and is generally characterized by attenuation of an amplitude and rotation of a phase for sending a signal. The CSI includes channel quality indication information, precoding matrix indicator information, and rank indicator information.

For an OFDM system with multiple subcarriers, the base station acquires CSI of one link in a current scheduling timeslot. In the embodiment of the present invention, there are multiple subcarriers over one link. CSIT refers to channel state information of each independent subcarrier, and CSIT of all subcarriers on one link forms the CSI of the current scheduling timeslot of the base station. In a time division duplexing (TDD, Time Division Duplexing) system, the base station performs channel estimation for a channel of a subcarrier in a current scheduling timeslot to obtain CSI of the current scheduling timeslot of the base station. In a frequency division duplexing (FDD, Frequency Division Duplexing) system, a user terminal performs measurement and estimation for channel state information of a base station, and feeds back the obtained CSI to the base station by using uplink channel information, and the base station receives the CSI of the current scheduling timeslot that is fed back by the user terminal. The manner of feeding back the uplink channel information includes periodic channel information feedback over a physical uplink control channel and non-periodic channel information feedback over a physical uplink data shared channel.

In the embodiment of the present invention, if the current scheduling timeslot has $n_F$ subcarriers, a CSIT estimation value of the $n^{th}$ subcarrier in a frequency domain is as follows:

$$\hat{H}_n = H_n + \Delta H_n, \ \Delta H_n \sim CN(0, \sigma_e^2)$$

where $H_n$ is an actual CSIT of the $n^{th}$ subcarrier, $\Delta H_n$ represents an error value of the CSIT, and $\Delta H_n$ satisfies a circularly symmetric Gaussian distribution where a mean value is 0 and a variance is $\sigma_e^2$.

202: Obtain a compensation factor according to the channel state information and a preset packet error ratio.

In the embodiment of the present invention, the base station obtains the compensation factor according to the CSI and the preset packet error ratio, where the compensation factor is a value corresponding to the preset packet error ratio in an inverse cumulative distribution function of a non-central chi-square random variable and a non-central parameter.

In the embodiment of the present invention, the non-central chi-square random variable is $\psi^2$, the non-central parameter is $s^2$, and $F_{\psi^2; s^2}^{-1}$ is the inverse cumulative distribution function of the non-central chi-square random variable $\psi^2$ and the non-central parameter $s^2$, where a computational formula of the non-central chi-square random variable $\psi^2$ is as follows:

$$\psi^2 = \frac{1}{N_d} \sum_{n \in I_B} |H_n|^2,$$

where a degree of freedom of $\psi^2$ is $2N_d$, and a variance is $\sigma_e^2 / N_d$; and $I_B$ is a set of $N_d$ independent subcarriers, $N_d$ is a resolution multipath number of a frequency selective channel, and $$N_d = \left\lfloor \frac{W}{\Delta f_c} \right\rfloor,$$

$W$ is a signal bandwidth, $\Delta f_c$ is a coherence bandwidth, and $H_n$ refers to the actual CSIT of the $n^{th}$ subcarrier.

A computational formula of the non-central parameter $s^2$ is as follows:

$$s^2 = \frac{1}{N_d} \sum_{n \in I_B} |\hat{H}_n|^2,$$

where $\hat{H}_n$ is a CSIT estimation value of the $n^{th}$ subcarrier.

In the embodiment of the present invention, the base station obtains the cumulative distribution function determined by the non-central chi-square random variable and the non-central parameter, solves the cumulative distribution function by taking the preset packet error ratio as a variable, and takes the solved numerical value as a value of the compensation factor of the current scheduling timeslot.

203: Acquire queue state information of the current scheduling timeslot of the base station.

In the embodiment of the present invention, the base station acquires the queue state information QSI of the base station in the current scheduling timeslot, where the QSI refers to the total number of buffered data packets of remaining service data in a queue at the beginning of the current scheduling timeslot.

It should be noted that step 203 may also be executed before or after step 201, or be executed simultaneously with step 201. Therefore, in the embodiment of the present invention, the time for obtaining the QSI is not limited.

204: Replace the channel state information with the compensation factor, and determine, according to the queue state information, a functional relationship between rate and power of sending data by the base station, so as to make the packet error ratio of the base station less than or equal to the preset packet error ratio.

In the embodiment of the present invention, the base station uses the QSI, replaces the CSI with the compensation factor, and determines the functional relationship between the rate and the power of sending data by the base station, so as to make the packet error ratio of the base station less than or equal to the preset packet error ratio.

In the embodiment of the present invention, if a model is built for the packet error ratio by using a probability that the rate of sending data by the base station exceeds instant interaction information, a computational formula of the packet error ratio of the rate r (bit/sec) of sending data based on the CSI and QSI is as follows:

$$PER(P_{tx}, r, \hat{H}, U) = Pr\left[ r > \sum_{n=1}^{n_F - 1} \log\left(1 + \frac{P_{tx}|H_n|^2}{n_F}\right) \right] \Big| [\hat{H}, U]$$

where $P_{tx}$ is the power of sending data, $\hat{H} = (\hat{H}_0, \ldots, \hat{H}_{n_F - 1})^T$ is the CSI of the current scheduling timeslot, and U refers to the QSI, namely, the total number of buffered data packets of remaining service data in a queue at the beginning of the current scheduling timeslot.

In the embodiment of the present invention, in order to avoid an inaccuracy problem caused by non-ideal CSI, it is necessary to control the packet error ratio of the base station, and specifically, the actual bit error ratio of the base station needs to be less than or equal to the preset bit error ratio. Therefore, $PER(P_{tx}, r; \hat{H}, U)$ is less than or equal to the preset bit error ratio $\epsilon_t$, and the following formula is obtained:

$$\epsilon_t \geq Pr\left[ r > \sum_{n=1}^{n_F - 1} \log\left(1 + \frac{P_{tx}|H_n|^2}{n_F}\right) \right] \Big| [\hat{H}, U]$$

In the embodiment of the present invention, $\hat{H}$ and $H_n$ in the preceding formula are replaced with the compensation factor, and the formula is solved, so as to obtain the functional relationship between the rate and the power of sending data by the base station as follows:

$$P_{tx}(r, \hat{H}) \cong \frac{(e^{r/n_F} - 1) n_F}{F_{\psi^2; s^2}^{-1}(\epsilon_t)}$$

205: Determine, according to the functional relationship and a generalized dynamic back pressure algorithm, the rate and total power of sending data by the base station, so as to minimize the total power of the base station.

After obtaining the functional relationship between the rate and the power of sending data, the base station determines, according to the functional relationship and GDBP, the rate and the total power of sending data by the base station, so as to minimize the total power of the base station, where the GDBP is DBP including a delay factor and a power-delay trade-off parameter. A GDBP algorithm may be used to achieve minimum power consumption of the base station under a condition in which stability of a queue is ensured.

In the embodiment of the present invention, the relationship between the total power g of sending data and the power $P_{tx}$ of sending data is as follows:

$$g = P_{tx} + P_{cct}$$

where $P_{cct}$ refers to circuit power, irrelevant to the rate r of sending data, and is a constant value.

A formula of the rate r of sending data in the GDBP is as follows:

$$r(U, \hat{H}) = \arg \max \{ U^\alpha r(1-\epsilon_t)\Delta t - V\{P_{tx}(r, \hat{H}) + P_{cct}\}\Delta t \}$$

where U is a value of the QSI, $\hat{H}$ is a value of the CSI, $\alpha$ is the delay factor, V is the power-delay trade-off parameter, $\epsilon_t$ is the preset packet error ratio, $P_{cct}$ is the circuit power, and $P_{tx}(r, \hat{H})$ is the power of sending data by the base station.

The base station substitutes $$P_{tx}(r; \hat{H}) \simeq \frac{(e^{r/n_F} - 1)n_F}{F^{-1}_{\psi^2; s^2}(\epsilon_t)}$$

to the formula in the GDBP. The rate and the power of sending data by the base station may be obtained as follows:

$$r = n_F \left[ \log \left\{ \frac{U^\alpha (1-\epsilon_t) F^{-1}_{\psi^2; s^2}(\epsilon_t)}{V} \right\} \right]^+ ; \text{ and}$$

$$g = \begin{cases} \frac{U^\alpha (1-\epsilon_t) n_F}{V} - \frac{n_F}{F^{-1}_{\psi^2; s^2}(\epsilon_t)} + P_{cct}, & \text{if } \frac{U^\alpha (1-\epsilon_t) n_F}{V} - \frac{n_F}{F^{-1}_{\psi^2; s^2}(\epsilon_t)} > 0 \\ 0, & \text{otherwise} \end{cases}$$

It should be noted that, in the embodiment of the present invention, the delay factor is used to indicate sensitivity of a service relative to time delay, and the value is between 0-1. The closer to 1 the delay factor is indicates the higher requirement of the service for the delay, and the closer to 0 the delay factor is indicates the less sensitive of the service to the delay. In a practical application, the value of the delay factor may be set according to the degree that the served service is sensitive to the time delay.

The power-delay trade-off parameter V is used to determine a trade-off relationship between power consumption and delay performance, and is a value similar to the Lagrange multiplier. In a practical application, the specific value of V may be determined by building a model. Obtaining data by building a model is a method well known by a person skilled in the art, and details will not be described herein.

In the embodiment of the present invention, after determining the rate and the total power of sending data, the base station transmits a buffered service data to the user terminal according to the determined rate and total power, and updates the number of bits in the buffered service data of the queue.

In the resource allocation solution in the embodiment of the present invention, inaccuracy of non-ideal CSI and total power consumption of sending data by a base station are fully considered, and rate and total power consumption of sending data by the base station are determined by using a compensation factor and GDBP that includes a delay factor and a power-delay trade-off parameter, which can effectively reduce a packet error problem caused by the inaccuracy of the non-ideal CSI, and minimize the total power consumption of sending data by the base station.

Figure 3:
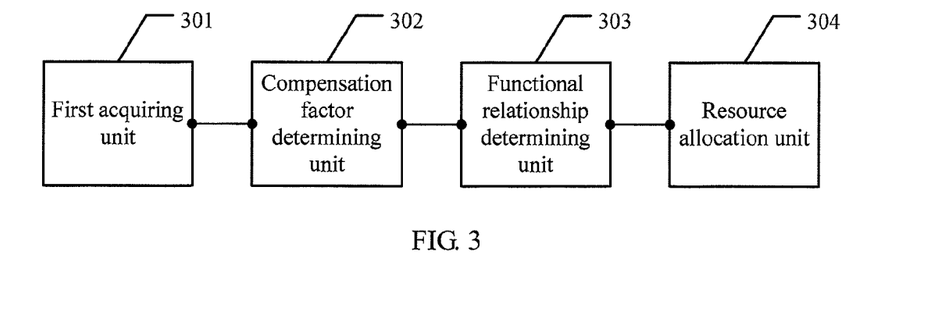
FIG. 3 is a schematic diagram of a base station according to an embodiment of the present invention.

Refer to FIG. 3, FIG. 3 is an embodiment of a base station according to an embodiment of the present invention, including:

a first acquiring unit 301, configured to acquire, by the base station, channel state information CSI of a current scheduling timeslot;

a compensation factor determining unit 302, configured to obtain a compensation factor according to the CSI and a preset packet error ratio, where the compensation factor is a value of the preset packet error ratio in an inverse cumulative distribution function of a non-central chi-square random variable and a non-central parameter;

a functional relationship determining unit 303, configured to replace the CSI with the compensation factor, and determine a functional relationship between rate and power of sending data by the base station if a packet error ratio of the base station is less than or equal to the preset packet error ratio; and a resource allocation unit 304, configured to determine, according to the functional relationship and a generalized dynamic back pressure algorithm, the rate and total power of sending data by the base station, so as to minimize the total power of the base station, where the generalized dynamic back pressure algorithm is a back pressure algorithm including a delay factor and a power-delay trade-off parameter.

In the embodiment of the present invention, a first acquiring unit 301 acquires CSI of a current scheduling timeslot, a compensation factor determining unit 302 obtains a compensation factor according to the CSI, then a functional relationship determining unit replaces the CSI with the compensation factor, and determines a functional relationship between rate and power of sending data by a base station if a packet error ratio of the base station is less than or equal to a preset packet error ratio, and a resource allocation unit 304 determines, by combining the functional relationship and the generalized dynamic back pressure algorithm, the rate and total power of sending data by the base station, so as to minimize the total power of the base station.

In the embodiment of the present invention, the compensation factor is determined by using the CSI, the CSI is replaced with the compensation factor, and the functional relationship between the rate and the power of sending data by the base station is determined when the packet error ratio of the base station is less than or equal to the preset packet error ratio, so that the base station can allocate a resource in the case of considering non-ideal CSI, and effectively control the packet error ratio of the base station. In addition, optimal rate and total power of sending data by the base station are determined by using the functional relationship and GDBP that includes a delay factor and a power-delay trade-off parameter, so that total power consumption of sending data by the base station may be minimized, thereby lowering energy consumption.

Figure 4:
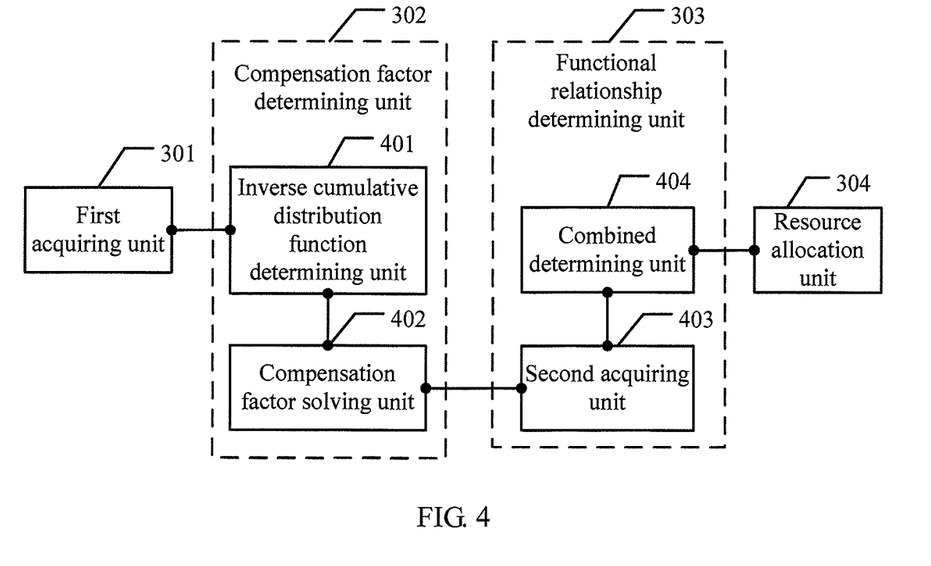
FIG. 4 is another schematic diagram of a base station according to an embodiment of the present invention.

Refer to FIG. 4 for a better understanding of the technical solution of the present invention. FIG. 4 is an embodiment of a base station according to an embodiment of the present invention, including:

a first acquiring unit 301, a compensation factor determining unit 302, a functional relationship determining unit 303, a resource allocation unit 304, which are described in the embodiment and shown in FIG. 3, are similar to content described in the embodiment and shown in FIG. 3, and will not be described herein again.

In the embodiment of the present invention, the compensation factor determining unit 302 includes:

an inverse cumulative distribution function determining unit 401, configured to obtain an inverse cumulative distribution function determined by a non-central chi-square random variable and a non-central parameter; and a compensation factor solving unit 402, configured to solve the inverse cumulative distribution function by taking a preset packet error ratio as a variable, so as to determine the compensation factor.

The functional relationship determining unit 303 includes:

a second acquiring unit 403, configured to acquire queue state information QSI of the base station in a current scheduling timeslot; and a combined determining unit 404, configured to replace the CSI with the compensation factor, and determine, according to the QSI, the functional relationship between the rate and the power of sending data by the base station, so as to make the packet error ratio of the base station less than or equal to the preset packet error ratio.

In the embodiment of the present invention, a first acquiring unit 301 acquires CSI of a current scheduling timeslot, a inverse cumulative distribution function determining unit 401 in a compensation factor determining unit 302 obtains a non-central chi-square random variable and a non-central parameter to determine a cumulative distribution function, and a compensation factor solving unit 402 solves the cumulative distribution function by taking a preset packet error ratio as a variable, so as to determine the compensation factor. Then, a second acquiring unit 403 in a functional relationship determining unit 303 acquires QSI of the base station in the current scheduling timeslot, and a combined determining unit 404 replaces the CSI with the compensation factor, and determines, according to the QSI, the functional relationship between rate and power of sending data by the base station, so as to make a packet error ratio of the base station less than or equal to the preset packet error ratio. Finally, a resource allocation unit 304 determines, according to the functional relationship and a generalized dynamic back pressure algorithm, the rate and total power of sending data by the base station, so as to minimize the total power of the base station.

In the embodiment of the present invention, a packet error problem caused by inaccuracy of non-ideal CSI is fully considered when the base station determines the rate and the power of sending data. The CSI is replaced with the compensation factor, which effectively controls the packet error ratio of the base station. In addition, the rate and the total power of sending data by the base station are finally determined by using a GDBP algorithm, so as to minimize power consumption of the base station.

A person of ordinary skill in the art may understand that all or a part of the steps of the methods in the foregoing embodiments may be implemented by a program instructing relevant hardware. The program may be stored in a computer readable storage medium. The computer storage medium may be a read-only memory, a magnetic disk, or an optical disk.

The resource allocation method and the base station in the orthogonal frequency division multiplexing system provided in the embodiments of the present invention are described above in detail. A person skilled in the art may make modifications to the specific implementation and application scopes based on the spirit of the embodiments of the present invention. In conclusion, the content of the specification shall not be construed as a limitation on the present invention.

What is claimed is:

1. A resource allocation method in an orthogonal frequency division multiplexing system, the method comprising:

acquiring, by a base station, channel state information (CSI) of a current scheduling timeslot;

obtaining a compensation factor according to the CSI and a preset packet error ratio, wherein the compensation factor is a value corresponding to the preset packet error ratio in an inverse cumulative distribution function of a non-central chi-square random variable and a non-central parameter;

replacing the CSI with the compensation factor, and determining a functional relationship between rate and power of sending data by the base station if a packet error ratio of the base station is less than or equal to the preset packet error ratio; and determining, according to the functional relationship and a generalized dynamic back pressure algorithm, the rate and total power of sending data by the base station, so as to minimize the total power of the base station, wherein the generalized dynamic back pressure algorithm is a back pressure algorithm comprising a delay factor and a power-delay trade-off parameter.

2. The method according to claim 1, wherein obtaining a compensation factor according to the CSI and a preset packet error ratio, wherein the compensation factor is a value corresponding to the preset packet error ratio in an inverse cumulative distribution function of a non-central chi-square random variable and a non-central parameter comprises:

obtaining the inverse cumulative distribution function determined by the non-central chi-square random variable and the non-central parameter; and solving the inverse cumulative distribution function by taking the preset packet error ratio as a variable, so as to determine the compensation factor.

3. The method according to claim 1, wherein replacing the CSI with the compensation factor, and determining a functional relationship between rate and power of sending data by the base station if the packet error ratio of the base station is less than or equal to the preset packet error ratio comprises:

acquiring queue state information QSI of the base station in a current scheduling timeslot; and replacing the CSI with the compensation factor, and determining, according to the QSI, the functional relationship between the rate and the power of sending data by the base station, so as to make the packet error ratio of the base station less than or equal to the preset packet error ratio.

4. The method according to claim 1, wherein a formula of the generalized dynamic back pressure algorithm is:

$$r(U,\hat{H}) = \arg\max\{U^\alpha r(1-\epsilon_t)\Delta t - V[P_{tx}(r,\hat{H}) + P_{cct}]\Delta t\}$$

wherein r is the rate of sending data by the base station, U is a value of the QSI, $\hat{H}$ is a value of the CSI, $\alpha$ is the delay factor, V is the power-delay trade-off parameter, $\epsilon_t$ is the preset packet error ratio, $P_{cct}$ is a circuit power, and $P_{tx}(r,\hat{H})$ is the power of sending data by the base station.

5. The method according to claim 1, wherein the functional relationship between the rate and the power of sending data by the base station is:

$$P_{tx}(r;\hat{H}) \cong \frac{(e^{r/n_F}-1)n_F}{F^{-1}_{\psi^2,s^2}(\varepsilon_t)}$$

wherein r is the rate of sending data by the base station, $n_F$ is the number of subcarriers in the current scheduling timeslot, and $F^{-1}_{\psi^2,s^2}(\epsilon_t)$ refers to a value of the compensation factor when the preset packet error ratio is $\epsilon_t$.

6. The method according to claim 1, wherein formulas of the rate and the total power of sending data by the base station are:

$$r = n_F \left[ \log \left\{ \frac{U^\alpha(1-\varepsilon_t)F^{-1}_{\psi^2;s^2}(\varepsilon_t)}{V} \right\} \right]^+, \text{ and}$$

$$g = \begin{cases} \frac{U^\alpha(1-\varepsilon_t)n_F}{V} - \frac{n_F}{F^{-1}_{\psi^2;s^2}(\varepsilon_t)} + P_{cct}, & \text{if } \frac{U^\alpha(1-\varepsilon_t)n_F}{V} - \frac{n_F}{F^{-1}_{\psi^2;s^2}(\varepsilon_t)} > 0 \\ 0, & \text{otherwise,} \end{cases}$$

respectively,
wherein $n_F$ is the number of subcarriers in the current scheduling timeslot, U is the value of the QSI, $\alpha$ is the delay factor, V is the power-delay trade-off parameter, $\varepsilon_t$ is the preset packet error ratio, $P_{cct}$ is the circuit power, and $F^{-1}_{\psi^2;s^2}(\varepsilon_t)$ refers to a value of the compensation factor when the preset packet error ratio is $\varepsilon_t$.

7. The method according to claim 1, wherein acquiring, by the base station, channel state information CSI of a current scheduling timeslot comprises:
receiving, by the base station, the CSI of the current scheduling timeslot that is fed back by a user terminal;
or,
performing, by the base station, channel estimation on a channel of a subcarrier in the current scheduling timeslot, so as to obtain the CSI of the current scheduling timeslot.

8. A base station, comprising:
a first acquiring unit, configured to acquire, by the base station, channel state information (CSI) of a current scheduling timeslot;
a compensation factor determining unit, configured to obtain a compensation factor according to the CSI, wherein the compensation factor is a value of a preset packet error ratio in an inverse cumulative distribution function of a non-central chi-square random variable and a non-central parameter;
a functional relationship determining unit, configured to replace the CSI with the compensation factor, and determine a functional relationship between rate and power of sending data by the base station if a packet error ratio of the base station is less than or equal to the preset packet error ratio; and
a resource allocation unit, configured to determine, according to the functional relationship and a generalized dynamic back pressure algorithm, the rate and total power of sending data by the base station, so as to minimize the total power of the base station, wherein the generalized dynamic back pressure algorithm is a back pressure algorithm comprising a delay factor and a power-delay trade-off parameter.

9. The base station according to claim 8, wherein the compensation factor determining unit comprises:
an inverse cumulative distribution function determining unit, configured to obtain the inverse cumulative distribution function determined by the non-central chi-square random variable and the non-central parameter; and
a compensation factor solving unit, configured to solve the inverse cumulative distribution function by taking the preset packet error ratio as a variable, so as to determine the compensation factor.

10. The base station according to claim 8, wherein the functional relationship determining unit comprises:
a second acquiring unit, configured to acquire queue state information QSI of the base station in a current scheduling timeslot; and
a combined determining unit, configured to replace the CSI with the compensation factor, and determine, according to the QSI, the functional relationship between the rate and the power of sending data by the base station, so as to make the packet error ratio of the base station less than or equal to the preset packet error ratio.

* * * * *